United States Patent
Dillon

(10) Patent No.: US 8,761,079 B2
(45) Date of Patent: Jun. 24, 2014

(54) METHOD AND APPARATUS FOR SELECTING APPROPRIATE CODING SCHEME AND TRANSMISSION RATE FOR TRANSMITTING A FRAME ACROSS A COMMUNICATION NETWORK

(75) Inventor: Matt J. Dillon, Boulder, CO (US)

(73) Assignee: Motorola Mobility LLC, Chicago, IL (US)

( * ) Notice: Subject to any disclaimer, the term of this patent is extended or adjusted under 35 U.S.C. 154(b) by 940 days.

(21) Appl. No.: 11/668,602

(22) Filed: Jan. 30, 2007

(65) Prior Publication Data

US 2008/0181160 A1    Jul. 31, 2008

(51) Int. Cl.
*H04W 52/18*    (2009.01)
(52) U.S. Cl.
USPC ............................. 370/318; 370/465; 455/522
(58) Field of Classification Search
USPC .......... 370/465, 437, 480, 281, 282; 455/450; 700/53
See application file for complete search history.

(56) References Cited

U.S. PATENT DOCUMENTS

| | | | |
|---|---|---|---|
| 7,236,801 B2 * | 6/2007 | Yun et al. ....................... | 455/522 |
| 7,352,796 B1 * | 4/2008 | von der Embse ............. | 375/146 |
| 7,620,370 B2 * | 11/2009 | Barak et al. ................. | 455/67.13 |
| 7,657,277 B2 * | 2/2010 | Montojo et al. .............. | 455/522 |
| 2005/0088995 A1 * | 4/2005 | Li et al. .......................... | 370/332 |
| 2005/0090205 A1 * | 4/2005 | Catreux-Erceg et al. ....... | 455/78 |
| 2005/0094648 A1 * | 5/2005 | Van Den Heuvel et al. ........................ | 370/395.64 |
| 2005/0122999 A1 | 6/2005 | Scherzer et al. | |
| 2005/0195889 A1 | 9/2005 | Grant et al. | |
| 2006/0093026 A1 | 5/2006 | Montojo et al. | |
| 2006/0215559 A1 * | 9/2006 | Mese et al. ..................... | 370/232 |
| 2007/0058603 A1 * | 3/2007 | Song et al. ..................... | 370/342 |
| 2007/0066242 A1 * | 3/2007 | Yi et al. .......................... | 455/69 |
| 2007/0286124 A1 * | 12/2007 | Grant et al. ................... | 370/331 |
| 2008/0123768 A1 * | 5/2008 | Harel et al. ................... | 375/267 |
| 2008/0153535 A1 * | 6/2008 | Gorokhov et al. ............ | 455/522 |
| 2008/0227401 A1 * | 9/2008 | Scherzer et al. ........... | 455/67.13 |
| 2009/0109999 A1 * | 4/2009 | Kuri et al. ..................... | 370/465 |

FOREIGN PATENT DOCUMENTS

| | | |
|---|---|---|
| JP | 2184125 A | 7/1990 |
| WO | 2005050875 A1 | 6/2005 |

OTHER PUBLICATIONS

The State Intellectual Property Office of the People-S Republic of China, Notification of the First Office Action, Mar. 26, 2012, all pages.
Kipos Notice of Preliminary Rejection(English Translation), Dec. 13, 2013, all pages.

* cited by examiner

Primary Examiner — Habte Mered

(57) ABSTRACT

A method and apparatus include a scheduling entity (208) for selecting a coding scheme and transmitting the frame (304) across a communication network (100). The controller (206) coupled to scheduling entity (208) determines a transmission gain for the frame based on the received signal interference and assigned reliability factor for the communication node. The scheduler entity (208) selects the lowest coding scheme for the frame corresponding to the determined transmission gain. The transceiver (214) coupled to controller (206) via interface (212) receives the encoded frame and transmits the frame to a plurality of mobile stations in the communication network (100).

19 Claims, 5 Drawing Sheets

METHOD AND APPARATUS FOR SELECTING APPROPRIATE CODING SCHEME AND TRANSMISSION RATE FOR TRANSMITTING A FRAME ACROSS A COMMUNICATION NETWORK

FIELD OF THE INVENTION

The present invention generally relates to selecting a coding scheme and transmitting frames across a communication network, and more particularly to transmitting frames with the repetition rates being based on transmission gains.

BACKGROUND

A wireless communication system provides a two-way communication between a plurality of fixed or portable subscriber units and a fixed network infrastructure, such as base station or an access point. The fixed network infrastructure uses channel control information to establish links for the two-way communication. The channel control information is sent through the wireless communication system as part of a frame. The channel control information occupies a significant portion of the frame as it contains information necessary for establishing and maintaining communication in the wireless communication system. Therefore, the channel control information reduces the amount of space in a frame that can be used for transmitting user data.

In current systems, a base station receives channel quality information (CQI) from a subscriber station and accordingly categorizes the subscriber station into different groups. The base station encodes and transmits the channel control information based upon the group of the subscriber station. In general, two types of channel control information are transmitted from the base station to a subscriber station. First channel control information is transmitted to all the subscriber stations in a cell regardless of the group of a subscriber station. Second channel control information is separately transmitted to all subscriber stations by group. The base station assigns a coding scheme based on the group of the subscriber station. The grouping of the subscriber stations is updated based on the channel quality information after predetermined intervals. However, the channel quality information may change frequently within the predetermined time interval and hence may not be reflected on the grouping of the subscriber stations. Thus, the assigned coding scheme may not be appropriate for the channel conditions during the predetermined intervals. Moreover, the process of updating the grouping of the subscriber unit is a complicated process, and forces more additional messaging for grouping/tracking the subscriber units in the communication network. Hence, the efficiency of the channel and the reliability factor of the communication node are reduced.

Accordingly, there is a need for more effectiveness in transmitting the channel control information across a communication network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
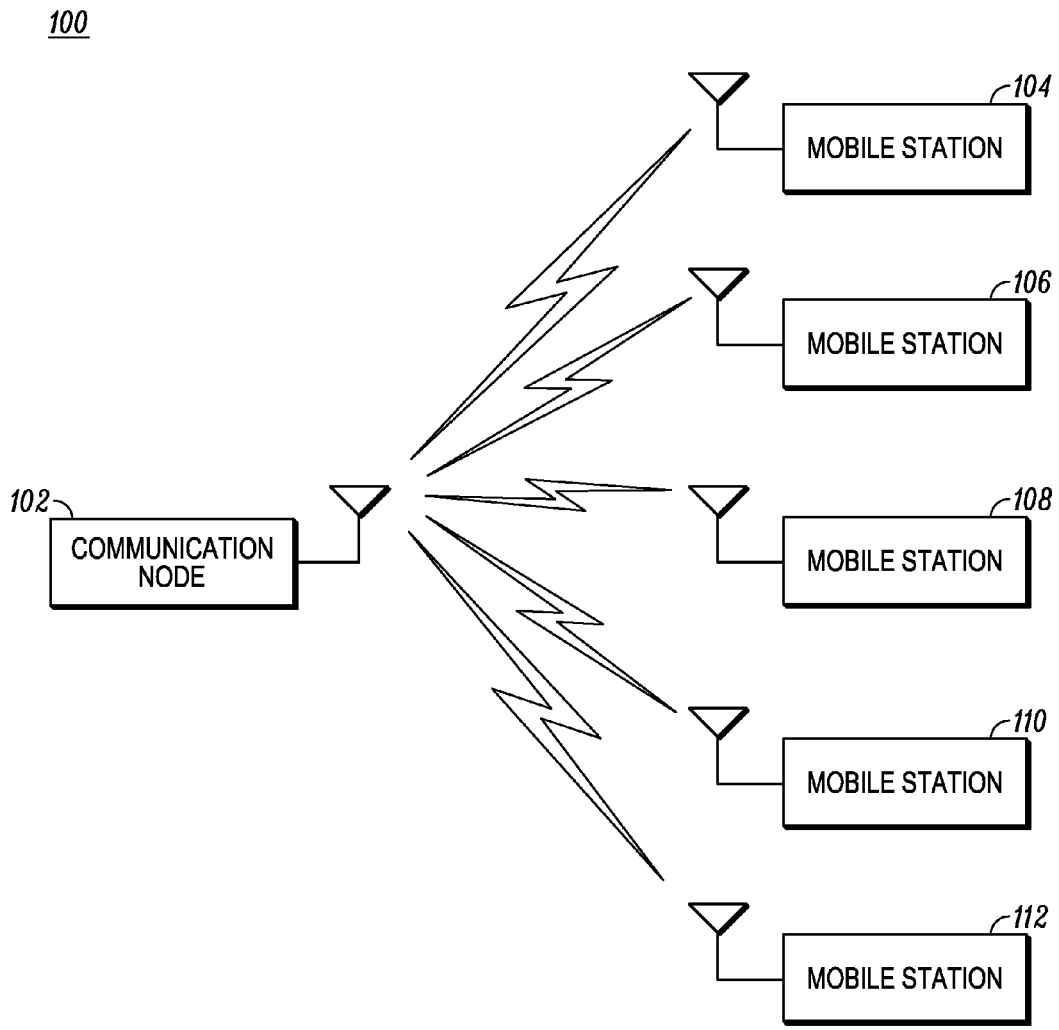
FIG. 1 is a block diagram of wireless communication network in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in selecting a coding scheme and transmitting a frame across the communication network. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of selecting a coding scheme and transmitting a frame across a communication network are described herein. The non-processor circuits may include, but are not limited to, a radio receiver, a radio transmitter, signal drivers, clock circuits, power source circuits, and user input devices. As such, these functions may be interpreted as steps of a method to perform selecting a coding scheme and transmitting a frame across a communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments are disclosed herein. For example, one method for selecting a coding scheme for a frame in a communication node includes assigning a reliability factor for a communication node and determining signal interference associated with the mobile station. The method also includes determining a transmission gain to reduce the signal interference, wherein the transmission gain is based upon the determined signal interference and the assigned reliability factor for the communication node. The method further includes selecting a coding scheme to achieve the transmission gain for a frame to be transmitted to the mobile station.

Another embodiment includes a communication node for selecting a coding scheme for a frame. The communication node includes a transceiver for transmitting and receiving signals wherein the signals are made up of a plurality of frames and includes signal interference, and a controller coupled to the transceiver. The controller determines a transmission gain for transmitting signals and wherein the transmission gain is based upon a reliability factor and the received signal interference. A scheduler is coupled to the controller for selecting a coding scheme to achieve the transmission gain for the frame to be transmitted by the transceiver.

In an embodiment, a method for selecting a coding scheme for a frame in a communication node includes assigning a reliability factor for the communication node and receiving a carrier to interference plus noise ratio (CINR) from a mobile station. The method also includes determining transmission diversity gain in response to the received CINR and the assigned reliability factor. The method further includes selecting a repetition rate for a frame based on the determined transmission diversity gain.

FIG. 1 illustrates a block diagram of wireless communication network, hereafter referred to as communication network 100. The communication network 100 includes a communication node 102, and a plurality of mobile stations 104-112 located at different positions surrounding the communication node 102. The communication node 102 and the mobile stations 104-112 are configured to operate according to any of a number of different 2G, 3G and 4G technologies. These include GSM, CDMA, UMTS, CDMA2000, W-CDMA, OFDM and other technologies. Likewise, the communication node and mobile stations in other communication networks are configured to operate according to different wireless technologies. It is possible that neighboring communication networks can operate using the same wireless technology. The communication node 102 may also communicate with other communication nodes and with mobile stations using an IEEE-802.16-based wireless metropolitan area network. A different wireless protocol may employ the principles of the present invention.

In an embodiment, the communication node 102 may be a base station, an access point, an access router or the like. The communication node 102 provides wireless broadband access to the mobile stations 104-112 within the coverage area of the communication network 100. The mobile stations 104-112 may use the broadband network to access voice, data, video, video teleconferencing and/or other broadband services. The mobile stations 104-112 may be any of a number of mobile devices, including a wireless-enabled laptop computer, personal data assistant, notebook, handheld device, cellular phone, personal computer, personal digital assistant or other wireless-enabled devices. Furthermore, while only five mobile stations 104-112 have been depicted in FIG. 1 to avoid cluttering the diagram, it is understood that the communication network 100 may provide wireless broadband access to more or less mobile stations.

In operation, a data message sent by the communication node 102 to the mobile station is known as downlink communication. Similarly, the data message sent by the mobile station to the communication node 102 is known as uplink communication. The data message may be referred to as a packet, variable sized data units, or a frame. The frame comprises a media access protocol message (MAP) that is used as channel control information for allocating a channel to the mobile station.

In the embodiment of FIG. 1, the communication node 102 is capable of communicating with each of the mobile stations 104-112. The mobile station determines a channel condition associated with it. The channel condition includes a carrier to interference plus noise ration (CINR), a signal to noise ration (SNR) or a frame error rate (FER). The determined channel condition may be further transmitted to the base station via feed back channel. The base station collects the channel condition associated with each mobile station and accordingly determines the signal interference in each channel. The signal interference indicates the amount of error that may occur in the frame. The transmission gain required for the frame is determined by the received signal interference so as to reach the mobile station with a reduced error rate.

Figure 2:
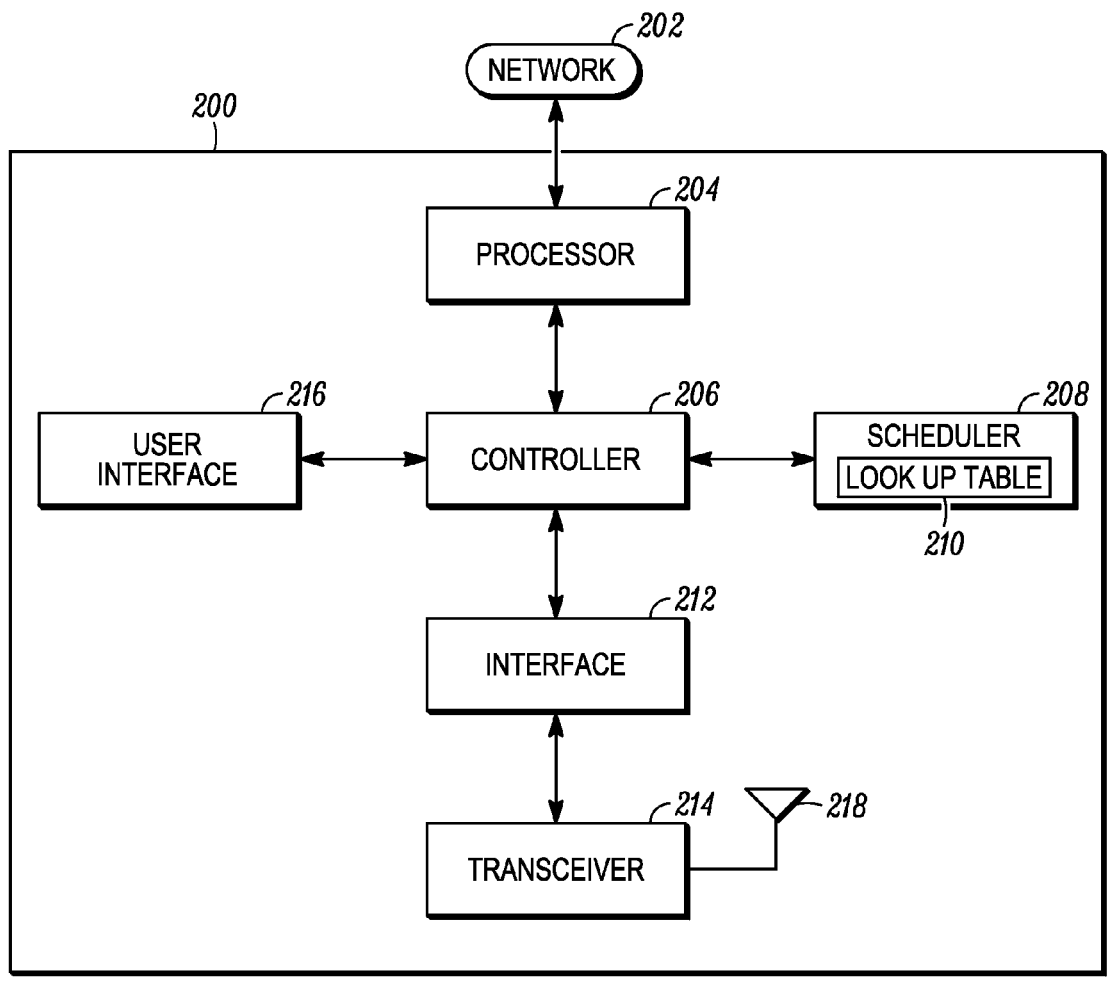
FIG. 2 is a block diagram of a communication node in accordance with some embodiments of the invention.

FIG. 2 is a block diagram of a communication node 200 in accordance with some embodiments of the invention. In an embodiment, a transceiver 214 communicates across the communication network via at least one antenna 218. The controller 206 and the transceiver 214 communicate via the interface 212. In particular, the controller 206 coupled to the processor 204 submits fixed- or variable-sized data units, cells or packets, all generally referred to as "frames", to the transceiver 214. The transceiver 214 further transmits the received frames to a plurality of mobile stations. The controller 206 may also send user data frames, management frames and other data directly to the transceiver 214. The controller 206 submits a transmission gain required for the frame to attain the assigned reliability at a reduced error rate, to the scheduler 208 of the communication node 200. Further, the transceiver 214 receives the coded frames from the controller 206 and transmits the frames across the communication network in accordance with parameters within the frame. The transceiver 214 also receives frames of information from the mobile stations via antenna 218 and provides the received frames to the controller 206 via the interface 212. The transceiver 214 may also report status information to the controller 206. For example, the status information may include an indication of whether the frames have been successfully transmitted. A user interface is coupled to a controller for assigning the reliability factor for the communication node. The reliability factor may be a measure acceptable of a percentage of frames transmitted to a plurality of mobile stations without an error. The reliability factor may be assigned by an operator in the communication node via the user interface coupled to the controller.

The particular configuration and implementation of the controller 206 depends on the type of the communication network, its data transfer bandwidth as well as the type and amount of information being processed. In an embodiment of the communication node 200, the controller 206 and the scheduler 208 operate as, among other things, is a management and frame-scheduling entity that coordinates functions with other network-attached devices such as mobile stations, an access point, a base station and the like.

In an embodiment, the communication node 200 employs a transceiver 214 coupled to the interface 212 and receives the channel condition information associated with the mobile station. The channel condition information may be CINR, SNR, or FER for the frame. The channel condition information is forwarded to the controller 206 via interface 212. The controller 206 then processes the channel condition information and determines the signal interference in the channel. In addition, the controller also receives the reliability factor assigned by an operator via the user interface. The controller further determines a transmission gain required for the frame that is to be transmitted to the mobile station. This is succeeded by compensating the signal interference so as to achieve the reliability factor assigned for the communication node. The transmission gain may be a transmission diversity gain of the antenna. A calculation on the probability distribution function of an antenna is made to determine the transmission gain. The transmission diversity gain may be obtained via an antenna array, smart antenna, multiple inputs and multiple outputs (mimo) antenna, or broadcast antenna. Different diversity techniques are employed to determine the transmission gain. For example, using Transmit Adaptive Array-Max Ratio Transmission (TxAA-MRT) transmit diversity, a transmission gain of 7 db is obtained. Similarly, using Transmit Adaptive Array-Eigen Beam Forming (TxAA-EBF) transmit diversity, a transmission gain of 6 db is achieved, and employing Alamouti transmit diversity, a transmission gain of 1 db is obtained.

Furthermore, the controller 206 forwards the determined transmission gain to the scheduler 208. The scheduler 208 selects a coding scheme for the frame based upon the determined transmission gain. The coding scheme may include assigning a repetition rate for a media access protocol message in the frame. The repetition rate is kept as low as possible so as to achieve reliability factor for the communication node and also to attain the lowest error rate for the frame.

In an embodiment, the processor 204, coupled to the controller 206, maps external network data to access control data. The access control data may be a media access controller service data unit (MAC SDU). The processor 204 forwards the access control data to the controller 206. The controller 206 receives a series of access control data and converts each access control data into frames by adding necessary header information. The frame may be a MAC packet data unit (PDU). In addition, the controller 206 also manages the buffering of frames. The frames, with necessary header information, are forwarded to the scheduler 208. The scheduler 208 receives the frames and the determined transmission gain for each frame from the controller. The scheduler is provided with a look up table that has different predefined coding schemes for the various transmission gains. The coding scheme may be a repetition rate required for the frame. The scheduler 208 selects a coding scheme for the determined transmission gain from the multiple coding schemes stored in the look up table 210. The look up table 210 can be a part of the scheduler or be found elsewhere in the communication system 100. The coding scheme selected would thus be the one required for the frame to be transmitted with a reduced error rate for the assigned reliability factor. Finally, the frame is encoded with the selected coding scheme and transmitted to the mobile station. The process is repeated for all the frames and all the channels associated with the mobile stations.

Figure 3:
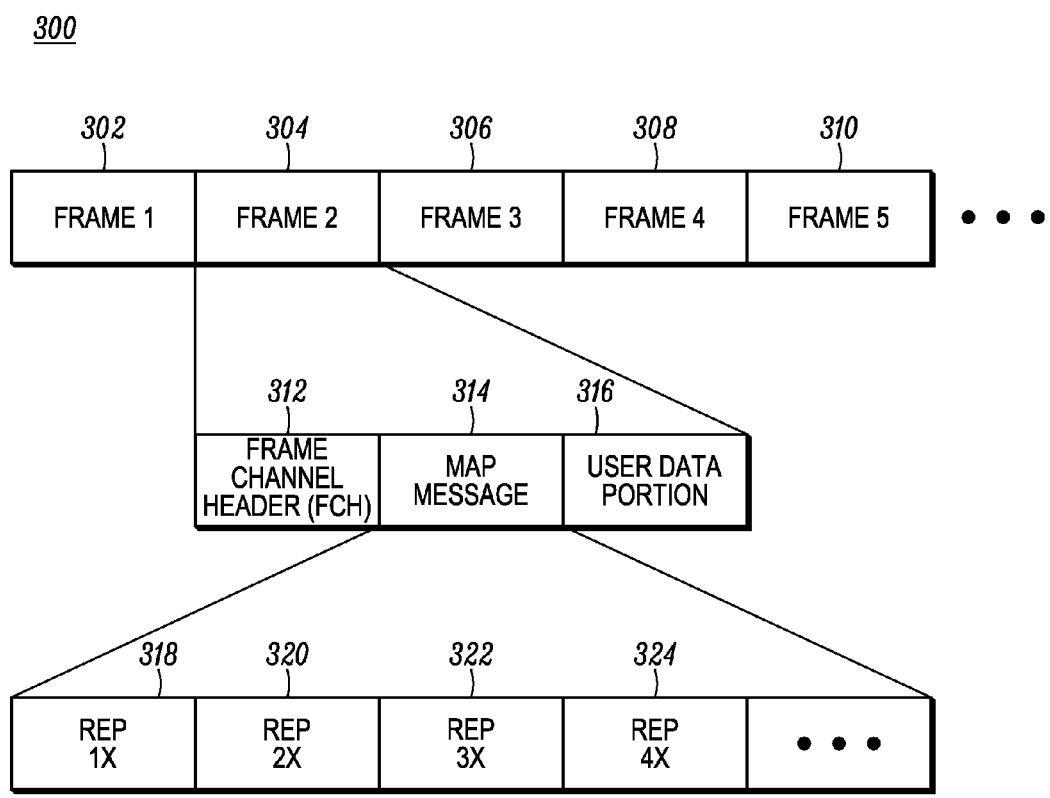
FIG. 3 is a structure of a frame in accordance with some embodiments of the invention.

FIG. 3 shows a structure of a frame according to an embodiment of the present invention. The communication node 102 employs a series of frames 302-310 for allocating a channel to the mobile stations. Each of the frames 302-310, e.g. frame 304, includes a media access protocol (MAP) message 314 for allocating a channel to the mobile station. The MAP message 314 is encoded such that it can be decoded by the one of the mobile stations 104-112 with the poorest signal quality. This may, however, result in substantial process redundancy in the downlink MAP and the uplink MAP, thereby significantly increasing overheads. This process redundancy is necessary for the mobile stations 104-112 with the poor signal quality but is not necessary for the other mobile stations. Thus, the scheduler 208 employs a simple repetition coding technique that can reduce the channel overheads by determining a coding scheme according to the principles of the present invention that varies the coding scheme between frames based on various criteria.

The repetition coding technique is a process where a plurality of transmission symbols in a frame is repeated numerous times. In an embodiment of WiMAX network, the transmission symbols may be called slots, which are a combination of time symbols and frequency tones. The slots may be combined together to form the MAP and user data portions of the frame. The MAP portion, known as MAP message, undergoes the repetition coding technique. In another embodiment, the repetition coding may also be applied to the user data portion.

In an embodiment, the MAP message in a frame is repeated numerous times depending on the received signal interference in the channel and the assigned reliability factor for the communication node. The number of times the MAP message is repeated is represented by a repetition factor or repetition rate of the frame. In one embodiment, the scheduler allows for a simple repetition coding technique to be used on the MAP message 314 in addition to the base coding technique. The base coding technique may be a quadrature phase shift keying (QPSK), a binary phase shift keying (BPSK) or other coding techniques. In another embodiment, different coding techniques such as changing the coding rate or modulation order is also applicable. For example, the frame may be coded using a QPSK frame, a 16-QAM frame, or a 64-QAM frame.

In an embodiment of FIG. 3, the frame 304 has a frame channel header (FCH) 312, at least one MAP message 314, and a user data portion 316. The MAP message 314 may be a downlink MAP (DL-MAP) or uplink MAP (UL-MAP). The FCH 312 represents the repetition rate employed for the frame. The frame may also cover other data that is not shown in the FIG. 3 but is not necessary to the understanding of the present invention. The frame 304 may be of 5 ms duration and may have varying repetition rates. The repetition rate of the frame may vary depending on the determined transmission gain for the frame. A high repetition rate may reduce the error rate of the frame. However, this may not result in achieving the assigned reliability factor for the communication node. For example, a mobile station that requires a 2× repetition rate may easily decode the frame that has a 4× repetition rate without an error, but transmitting a frame with a 4× repetition rate may reduce the reliability factor for the communication node. Thus, a lowest possible repetition rate is selected for the frame so as to attain the reliability factor for the communication node at a reduced error rate. The repetition coding may be applicable to any type of communication network without any changes to the standard, as the FCH sent prior to the MAP message indicates the type of repetition rate used for the frame.

As the example shown in FIG. 1, five mobile stations 104-112 operate in a communication network 100. The mobile station 104 can decode the MAP message in a frame with a 1× repetition rate as it has good channel conditions. The mobile station 106 can decode the MAP message with a 2× repetition rate; mobile station 108 may require a 3× repetition rate to decode the MAP message without any errors; mobile station 110 may require a 4× repetition rate, and mobile station 112 may require a 5× repetition rate. The repetition rates can be based on the relative strength of the channel conditions with the best channel condition having the lowest rates and the poorest channel condition having the highest rates. A series of frames 302-310 of FIG. 3 could be employed for transmitting MAP messages to the mobile stations 104-112. The mobile station 104 can decode any of the frames 302-310 that has a repetition rate of 1× or more. The mobile station 106 can decode the frames that have a repetition rate of 2× or more. Similarly, the mobile station 112 can decode the frame that has a repetition rate of 5× or more. Thus, the lowest repetition rate is selected for each frame based on the signal interference in the channel and assigned reliability factor for the communication node.

The scheduler 208 selects a repetition rate from the multiple repetition rates stored in a look up table. The selected repetition rate for the frame corresponds to the determined transmission gain of the frame. The signal interference may be compensated for the determined transmission gain so as to attain the reliability factor for the communication node. For example, the mobile station 108 requires a 3× repetition rate to receive the frame without an error. However, selecting a repetition rate of 3× for the frame may reduce the reliability factor. Thus, the next lowest repetition rate of 2× may be selected by the scheduler 208 so as to attain the reliability factor and transmit the frame at a reduced error rate. Similarly, the mobile station 106 may require a repetition rate of 2× to decode the frame without any errors. The frame may be transmitted with a higher repetition rate of 3×, 4×, or 5×. Transmitting the frame with a higher repetition rate may reduce the error rate but may require a higher transmission gain which in turn reduces the reliability factor for the communication node. Thus, the lowest repetition rate of 2× is selected to achieve the reliability factor as well as transmit the frame at a reduced or no error rate.

Figure 4:
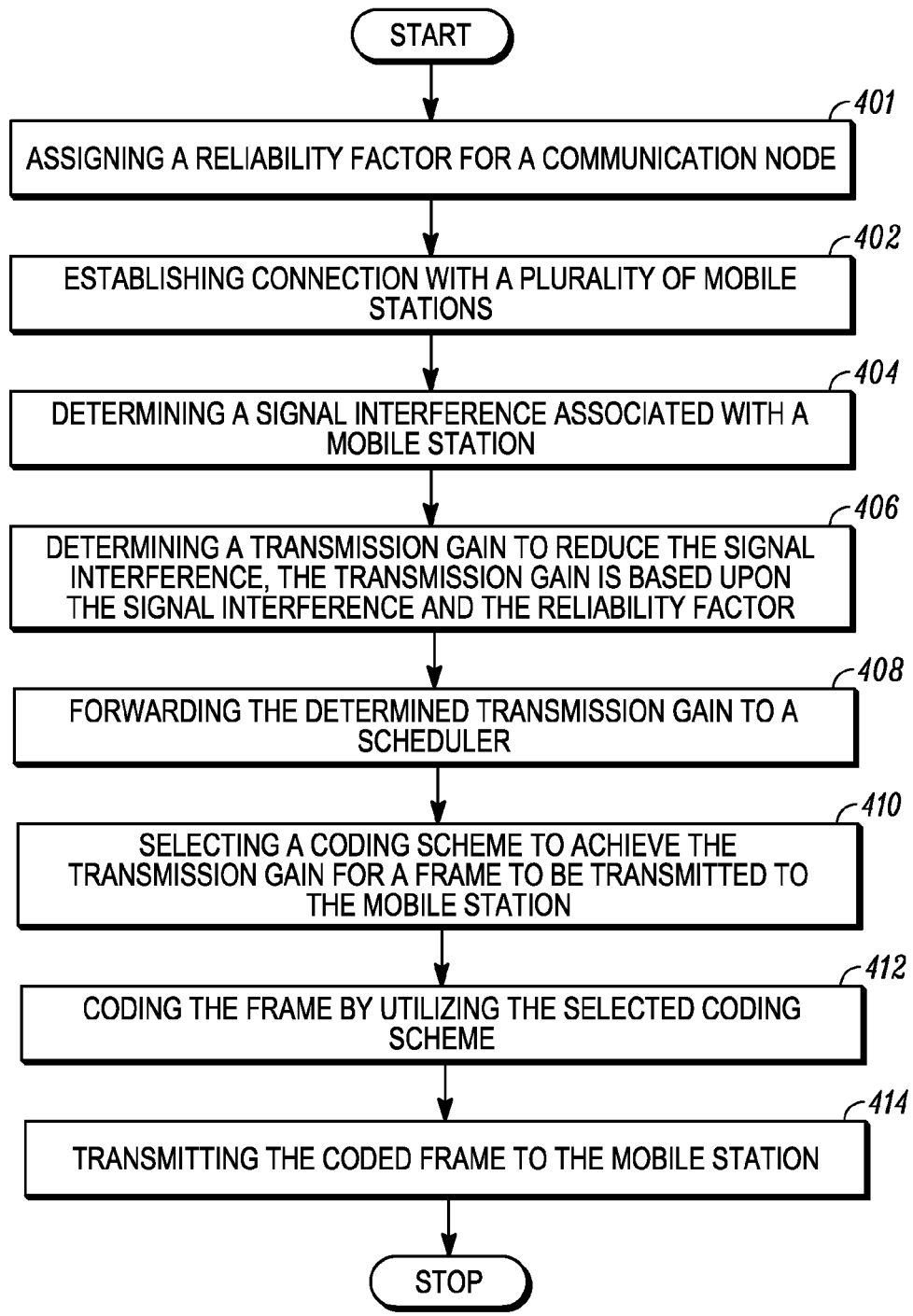
FIG. 4 is a flowchart of a method for transmitting a frame across a communication network in accordance with some embodiments of the invention.

FIG. 4 is a flow chart illustrating a method for transmitting the frames across a communication network. The communication node receives an assigned reliability factor 401 by an operator in the communication node. The communication node establishes 402 a connection with a plurality of mobile stations in the communication network. On the other hand, the communication node determines 404 a signal interference associated with a mobile station. The signal interference is determined based on the received channel condition from the mobile station. The channel condition includes carrier to interference plus noise ratio (CINR), signal to noise ratio (SNR), or frame error rate (FER). The controller determines 406 a transmission gain from the signal interference and the assigned reliability factor for the communication node. The transmission gain may be a transmission diversity gain of the antenna to transmit the frame with a reduced error rate for the assigned reliability factor. The controller further forwards 408 the determined transmission gain to a scheduler. The scheduler in the communication node selects 410 a coding scheme for the frame that corresponds to the determined transmission gain for the frame. The selected coding scheme may be one of the multiple coding schemes stored in a look up table of the scheduler or determined by another method based on the transmission gain. Finally, the frame is coded 412 through the selection of one of the multiple coding schemes and transmitted 414 to the mobile station in the communication network.

Figure 5:
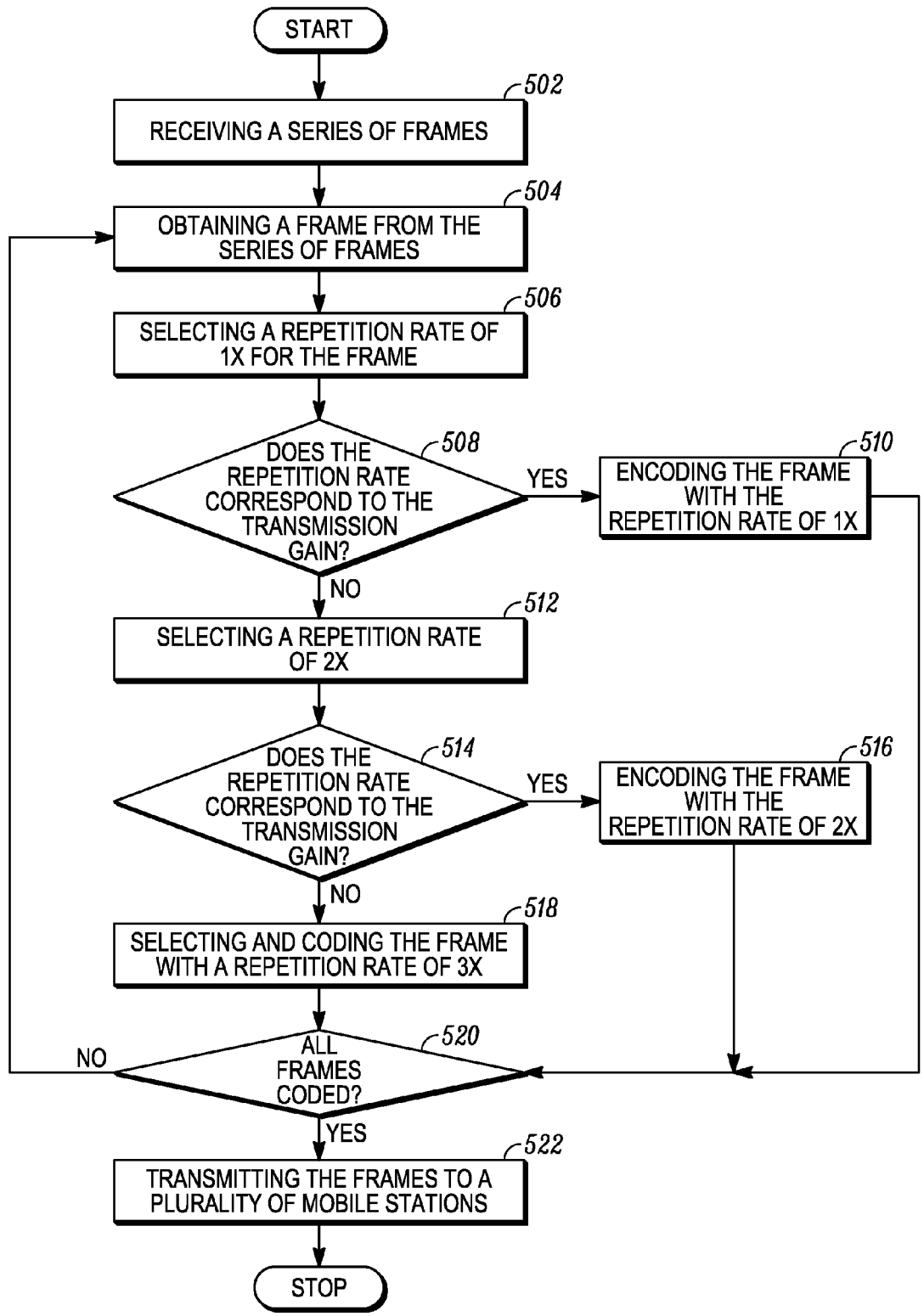
FIG. 5 is a flowchart of a method for selecting a coding scheme and transmitting a frame across a communication network in accordance with some embodiments of the invention.

FIG. 5 is a flow chart illustrating a process of the scheduler selecting a coding scheme for the frame and encoding the frame accordingly, e.g. steps 408-414 of FIG. 4. The scheduler of the communication node receives 502 a series of frames from the controller. The scheduler obtains 504 a frame from the series of frames and selects a lowest coding scheme for the frame. This refers to choosing the lowest repetition rate from the stored repetition rates in a look up table, e.g., as in steps 506, 512, 518 of FIG. 5.

For example, the scheduler selects 506 a repetition rate of 1× for the frame. The scheduler further checks 508 to confirm if the selected repetition rate corresponds to the determined transmission gain. In other words, the transmission gain required for the frame with a repetition rate of 1× is within the determined transmission gain. The transmission gain may be a transmission diversity gain of the antenna to transmit the frame with a reduced error rate for the assigned reliability factor. If the repetition rate corresponds to the transmission gain then the frame is coded 510 with the selected repetition rate of 1×. If the repetition rate of 1× does not correspond to the determined transmission gain then the next higher repetition rate of 2× is selected 512. The selected repetition rate of 2× is further checked 514 to confirm if the repetition rate of 2× corresponds to the determined transmission gain. If the repetition rate of 2× corresponds to the transmission gain, then the frame is coded with the selected repetition rate. If the repetition rate does not correspond to the transmission gain, then the scheduler selects the next higher repetition rate. This continues until the lowest repetition rate corresponding to the determined transmission gain is selected. The same process is repeated for all the frames in the series. Finally, the coded frames are transmitted to a plurality of mobile stations in the communication network.

In another embodiment, the mobile station receives the frames transmitted by the communication node. The mobile station determines the repetition rate of the frame with the help of the frame channel header (FCH) that is sent prior to the media access protocol (MAP) message. The frames may be transmitted at any repetition rate, irrespective of the standards of the communication network, as the FCH indicates the repetition rate for the frame. The mobile station collects the repeated MAP messages in the frame and rebuilds the frame with an acceptable error or signal loss, as the selection of repetition rate for the frame depends on the transmission gain for the frame, which in turn is dependent on the signal interference and the assigned reliability factor.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method comprising:
assigning a reliability factor for a communication node;
determining a signal interference associated with a mobile station;
determining a transmission gain to reduce the signal interference, wherein the transmission gain is based upon the determined signal interference and the assigned reliability factor for the communication node; and
selecting a coding scheme to achieve the transmission gain for a frame to be transmitted to the mobile station, wherein selecting the coding scheme comprises selecting a lowest repetition rate for the frame to be transmitted to achieve the determined transmission gain for the frame.

2. The method of claim 1, wherein the mobile station is one of a plurality of mobile stations.

3. The method of claim 2, wherein the frame to be transmitted is one of a plurality of frames to be transmitted to the plurality of mobile stations.

4. The method of claim 1, wherein determining the signal interference is based upon at least one of (a) a carrier to interference plus noise ratio, (b) a signal to noise ratio and (c) a frame error rate.

5. The method of claim 1, wherein determining the transmission gain further comprises selecting a type of an antenna for the communication node.

6. The method of claim 5, wherein the transmission gain is a transmission diversity gain of the antenna to transmit the frame with a reduced error rate for the assigned reliability factor.

7. The method of claim 5, wherein selecting the type of the antenna is
at least one of (a) arrays of an antenna, (b) a smart antenna, (c) a multiple input multiple output (MIMO) antenna and (d) a broadcast antenna.

8. The method of claim 1, wherein selecting the coding scheme further comprises utilizing a look up table to choose a lowest coding scheme for the determined transmission gain, the lowest coding scheme being one of a plurality of coding schemes in the look up table.

9. The method of claim 1 further comprises:
coding the frame by utilizing the selected coding scheme; and
transmitting the coded frame to the mobile station.

10. A communication node comprising:
a transceiver for transmitting and receiving signals wherein the signals are made up of a plurality of frames and include signal interference;
a controller coupled to the transceiver wherein the controller determines a transmission gain to reduce the signal interference for transmitting signals and wherein the transmission gain is based on upon a reliability factor and the received signal interference; and
a scheduler coupled to the controller for selecting a coding scheme to achieve the transmission gain for the frame to be transmitted by the transceiver, wherein selecting the coding scheme comprises selecting a lowest repetition rate for the frame to be transmitted to achieve the determined transmission gain for the frame.

11. The communication node of claim 10, wherein the scheduler further comprises a look up table for storing different coding schemes that are utilized for coding the frame.

12. The communication node of claim 11, wherein the scheduler chooses a lowest coding scheme corresponding to the determined transmission gain from different coding schemes in the look up table.

13. The communication node of claim 10, wherein the reliability factor is a measure of a percentage of frames transmitted to a plurality of mobile stations without an error.

14. The communication node of claim 10, wherein the transmission gain is obtained by at least one of (a) arrays of an antenna, (b) a smart antenna, (c) a multiple input and multiple output antenna (MIMO) and (d) a broadcast antenna.

15. The communication node of claim 10, wherein the controller compensates the signal interference for the determined transmission gain to achieve the assigned reliability factor for the communication node.

16. A method for a communication node comprising:
assigning a reliability factor for the communication node;
receiving a carrier to interference plus noise ratio (CINR) from a mobile station;
determining a transmission diversity gain responsive to the received CINR and the assigned reliability factor; and
selecting a lowest repetition rate for a frame based upon the determined transmission diversity gain.

17. The method of claim 16, wherein determining the transmission diversity gain further comprises calculating the probability distribution function of an antenna to obtain the transmission diversity gain for the assigned reliability factor.

18. The method of claim 16, wherein determining the transmission diversity gain further comprises compensating the received CINR for the assigned reliability factor by varying the transmission diversity gain of an antenna.

19. The method of claim 16, wherein the lowest repetition rate is one of a plurality of repetition rates in a look up table.

* * * * *